United States Patent
Bolognese et al.

(10) Patent No.: US 7,246,114 B2
(45) Date of Patent: Jul. 17, 2007

(54) SYSTEM AND METHOD FOR PRESENTING A QUERY EXPRESSED IN TERMS OF AN OBJECT MODEL

(75) Inventors: Luca Bolognese, Redmond, WA (US); Matt Warren, Redmond, WA (US); Vincenzo Lombardi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 411 days.

(21) Appl. No.: 10/274,576

(22) Filed: Oct. 21, 2002

(65) Prior Publication Data

US 2004/0078359 A1    Apr. 22, 2004

(51) Int. Cl.
*G06F 17/00* (2006.01)
*G06F 7/00* (2006.01)
*G06F 17/30* (2006.01)

(52) U.S. Cl. .................. 707/3; 707/4; 707/5; 707/100; 707/102; 707/103

(58) Field of Classification Search .................... 707/3, 707/4, 5, 100, 102, 103
See application file for complete search history.

(56) References Cited

U.S. PATENT DOCUMENTS

| | | | |
|---|---|---|---|
| 6,263,328 B1 * | 7/2001 | Coden et al. ................... | 707/3 |
| 6,609,123 B1 * | 8/2003 | Cazemier et al. .............. | 707/4 |
| 6,907,433 B2 * | 6/2005 | Wang et al. ............. | 707/104.1 |
| 6,968,344 B2 * | 11/2005 | Bahulkar et al. ............... | 707/3 |
| 2002/0059255 A1 * | 5/2002 | Wu .............................. | 707/10 |
| 2002/0184192 A1 * | 12/2002 | Hongell et al. ................. | 707/3 |
| 2003/0028551 A1 * | 2/2003 | Sutherland ................... | 707/200 |
| 2003/0033277 A1 * | 2/2003 | Bahulkar et al. ............... | 707/1 |
| 2004/0015487 A1 * | 1/2004 | Lin et al. ........................ | 707/3 |
| 2004/0015489 A1 * | 1/2004 | Anonsen et al. ............... | 707/3 |
| 2004/0019599 A1 * | 1/2004 | Trappen et al. ............. | 707/102 |

OTHER PUBLICATIONS

Alagic', S. "Type-Checking OQL Queries In the ODMG Type Systems", *ACM Transactions on Database Systems*, 1999, 24(3), 319-360.

Antonacci, F. et al., "AQL: An APL Based System for Accessing and Manipulating Data in a Relational Database System", *IBM Italia, Bari Scientific Center*, pp. 31-42.

Cattell, R. "Experience with the ODMG Standard", *Standard View*, 1995, 3(3), 90-95.

(Continued)

*Primary Examiner*—Apu Mofiz
*Assistant Examiner*—Cindy Nguyen
(74) *Attorney, Agent, or Firm*—Woodcock Washburn LLP

(57) ABSTRACT

A query string expressed in terms of an object model is received. The query includes a first instruction identifying a type of objects and a second instruction identifying selected objects of the identified type to be retrieved. The query may also include one or more statements identifying additional associated types to be retrieved. The query is translated into a database specific language, and a database is queried with the translated query. Query results are received from the database and are translated into an object model. The object model may be displayed on a display device.

19 Claims, 4 Drawing Sheets

OTHER PUBLICATIONS

Bach Pedersen, T. et al., "Extending OLAP Querying To External Object Databases", *CIKM*, 2000, McLean, VA USA, 405-413.

Fergaras, L. et al., "Towards an Effective Calculus for Object Query Languages", *SIGMOD*, 1995, San Jose, CA USA, 47-58.

Fergaras, L. et al., "Optimizing Object Queries Using an Effective Calculus", *ACM Transactions on Database Systems*, 2000, 25(4), 457-516.

"Standard Overview-ODMG 2.0 Book Extract", http://odmg.org/standard/odmgbookextract.htm, 2002, 23 pages.

* cited by examiner

SYSTEM AND METHOD FOR PRESENTING A QUERY EXPRESSED IN TERMS OF AN OBJECT MODEL

BACKGROUND OF THE INVENTION

1. Field of the Invention

The present invention relates to the field of database management, and, more specifically, to presenting a query to a database expressed in terms of an object model.

2. Description of the Prior Art

Data that is stored in a database may be modeled according to an object model. The object model includes objects that each have a unique identifier. An object can be categorized by its type. All elements of a given type have a common set of properties and a common set of defined operations. The state of an object is defined by the values it carries for its set of properties. Properties can be either "primitive" properties or "link" properties. Primitive properties are properties of the object itself. Link properties are relationships between the object and one or more other objects. Typically, the values of an object's properties can change over time.

Some existing query languages enable a user to run queries on data that is stored in a database and modeled according to an object model. Such "object model" query languages have been designed with syntax that is similar to structured query language (SQL), which is used to query relational databases. Designing such an object model query language with such similar syntax as SQL makes the language more intuitive and familiar to the author of a query. Specifically, such an object model query language may include a "select" statement, a "from" statement, and a "where" statement. The select statement identifies the type of objects to be retrieved. The "from" statement identifies the objects from which the type is selected. The "where" statement is a predicate identifying a condition of a property of the selected object type that must be satisfied. Such object model query languages may also include dot expressions. Dot expressions are used to identify a property of an object. Dot expressions may identify either a primitive property or a link property.

Although such existing queries including three instructions may be intuitive and familiar to a query author, such queries may often be long and complex. The length and complexity of a query is increased when the query includes multiple link properties. Such queries including multiple link properties may have multiple dot expressions in each of the three statements. The length and complexity of object queries would be greatly reduced if, rather than including three instructions, object queries included only two instructions; a first instruction identifying a type of objects and a second instruction identifying selected objects of the identified type to be retrieved.

Furthermore, existing object model query languages are limited in that they enable a query author to identify only a single type of object to be retrieved. It is often desirable to retrieve not only a single object type, but to retrieve a specified object type and all related object types. For example, an existing object query requesting "all customers that live in California" will retrieve only "customer" objects that have related address objects with a state property equal to California. However, a query author may wish to retrieve not only "customer" objects but also the related "address" object and possibly other related objects. In existing object model query languages, a query author wishing to retrieve multiple object types must issue multiple queries. Thus, the effectiveness of object queries could be vastly improved by enabling a query author to identify a specified object type and multiple related object types to be retrieved.

SUMMARY OF THE INVENTION

Accordingly, systems and methods for presenting a query expressed in terms of an object model are disclosed. A query author defines a query expressed in terms of an object model. The object model is a model of data that is stored in a database that the author wishes to query.

The query includes two instructions. A first instruction identifies a specific type of objects that the author wishes to retrieve. A second instruction limits the first instruction by identifying a property that the author wishes the specified type of objects to posses. The property may be a primitive property or a link property. A primitive property is a property of the specified object itself. A primitive property may be a property of an object that satisfies a particular condition such as an integer value, a string, or a date. A link property is a relationship between the specified object and one or more other objects.

The query may also include a set of one or more statements that may be referred to as a "Span." The Span enables a query author to retrieve multiple object types using a single query. Each statement in the Span identifies one or more additional types of objects that the author wishes to retrieve. Each object type identified in the Span is associated with the object type specified in the instructions. Each object type identified in the Span may also be limited by identifying a property that the author wishes the object type to possess. The property may be a primitive property or a link property.

Upon defining the query, the author submits the query to a mapping engine. The mapping engine receives the query and translates the query into a language that is specific to the database. The mapping engine then queries the database with the translated query. The mapping engine receives query results from the database and translates the query results into the object model. The resulting object model may be displayed on a display device.

BRIEF DESCRIPTION OF THE DRAWINGS

The present invention will be better understood after reading the following detailed description of the presently preferred embodiments thereof with reference to the appended drawings, in which.

DETAILED DESCRIPTION

Figure 1:
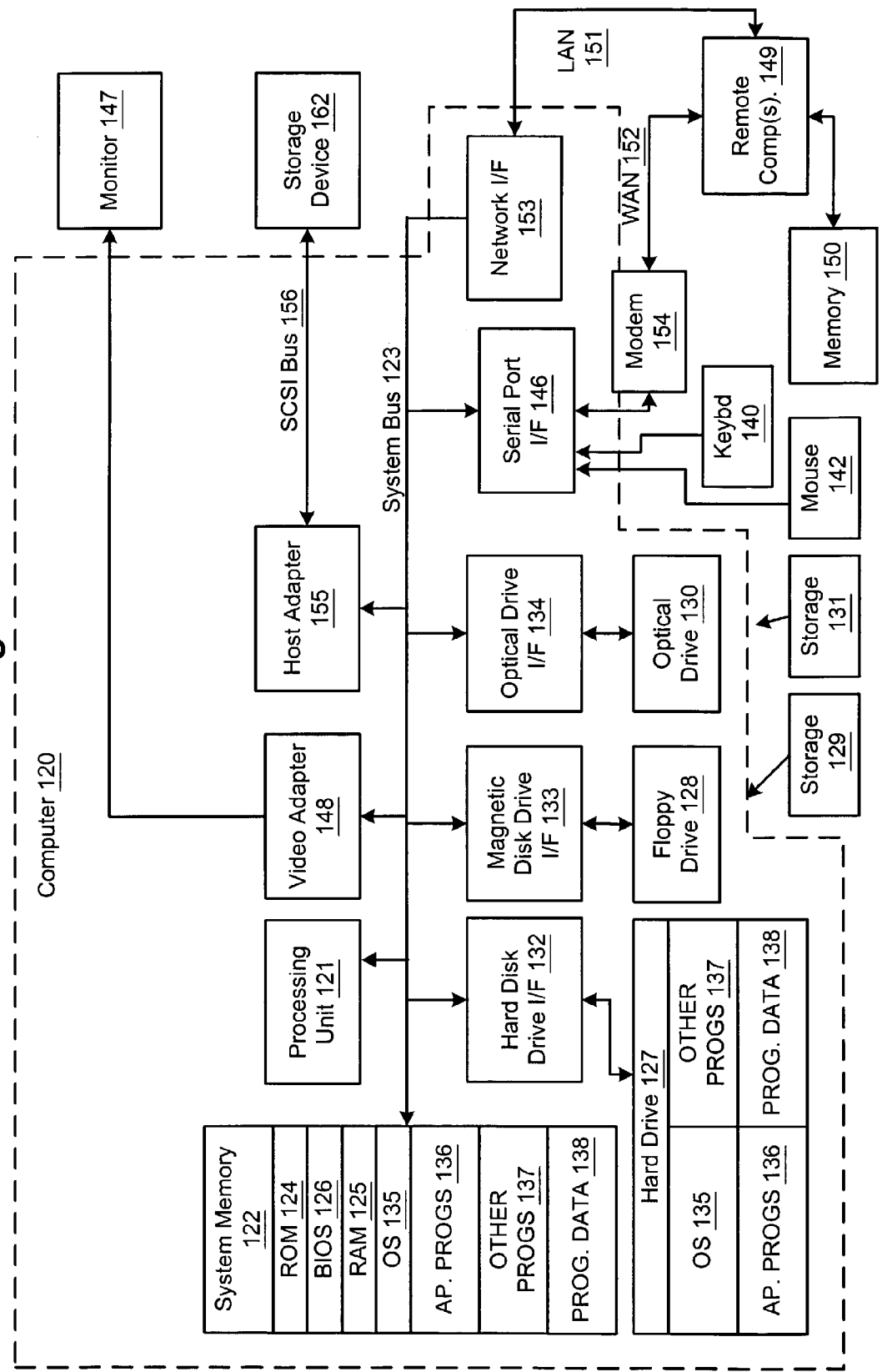
FIG. 1 is a block diagram representing a general purpose computer system in which aspects of the present invention and/or portions thereof may be incorporated.

A system that meets the above-mentioned objects and provides other beneficial features in accordance with the presently preferred exemplary embodiment of the invention will be described below with reference to aforementioned FIGS. Those skilled in the art will readily appreciate that the description given herein with respect to those figures is for explanatory purposes only and is not intended in any way to limit the scope of the invention. Throughout the description, like reference numerals will refer to like elements in the respective figures.

Computer Environment

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multiprocessor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Systems and Methods of the Present Invention

Generally, a query author defines and submits to a mapping engine a query expressed in terms of an object model. The query includes a first instruction identifying a type of objects and a second instruction identifying selected objects of the identified type to be retrieved. The query may also include one or more statements identifying additional associated object types to be retrieved. The mapping engine translates the query into a database specific language, and a database is queried with the translated query. Query results are received from the database. The mapping engine translates the query results into an object model. The object model may be displayed on a display device. Systems and methods of the present invention enable queries to be presented with only two instructions, thereby decreasing the length and complexity of queries. Furthermore, systems and methods of the present invention enable the query author to retrieve multiple associated objects rather than only a single object.

Figure 2:
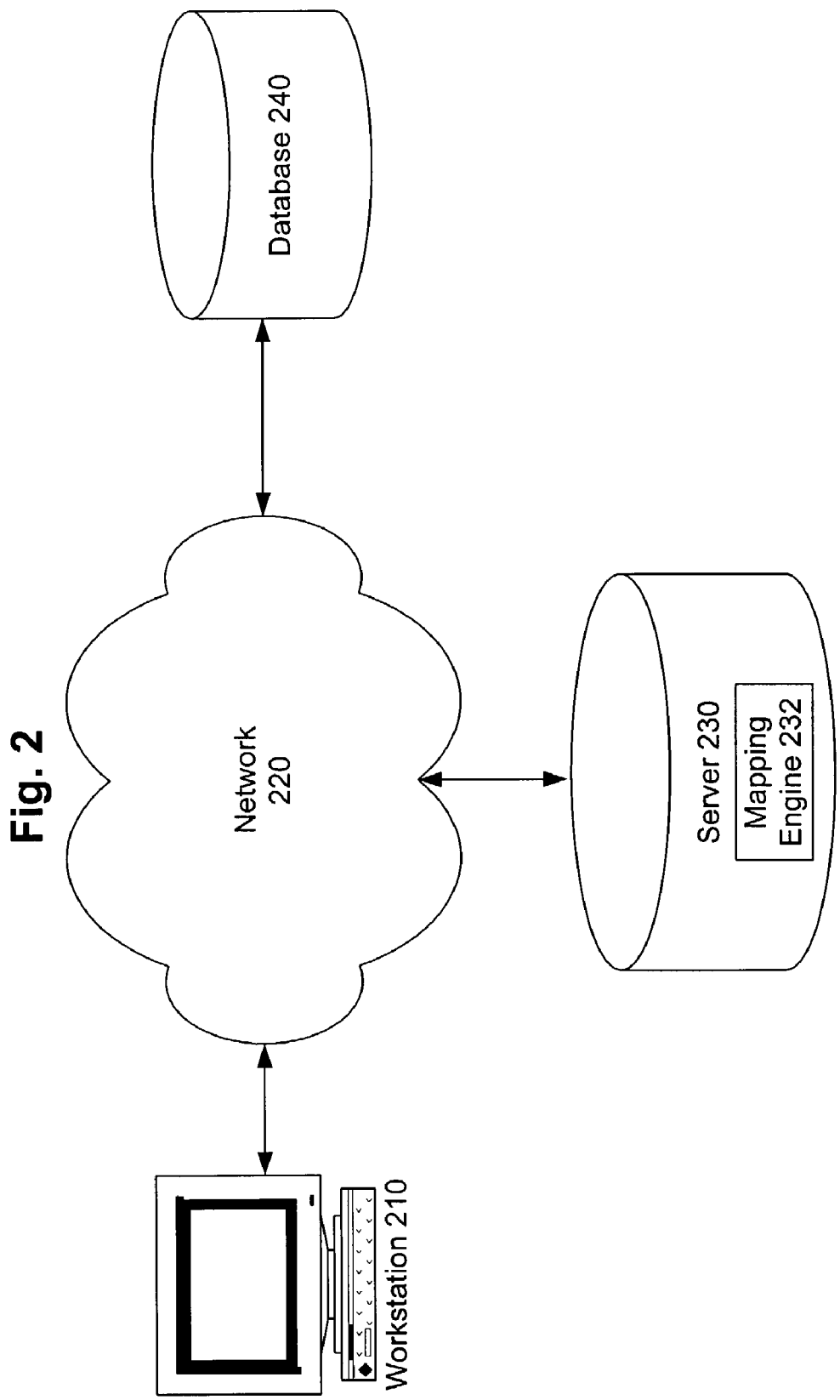
FIG. 2 is a block diagram of an illustrative system for presenting a query in accordance with the present invention.

FIG. 2 is a block diagram of an illustrative system for presenting a query in accordance with the present invention.

As shown, a query author at workstation 210 may define a query expressed in terms of object model 232. Workstation 210 may be any personal computing device such as, for example, a portable laptop computer or a desktop computer. Object model 232 is a model of data stored at database 240.

The query is submitted from workstation 240 to server 230 over network 220. Network 220 is preferably a local area network (LAN). Network 230 may also be a wide area network (WAN) such as, for example, the Internet. Mapping engine 232 receives the query and translates the query into a language specific to database 240. Mapping engine 232 may be an application running on server 230. Server 230 queries database 240 with the translated query. After the query is performed, server 230 receives query results from database 240. Mapping engine 232 translates the query results into an object model. The object model may be transmitted back to workstation 210 for display at workstation 210. The system of FIG. 2 may be used to perform methods for presenting a query in accordance with the present invention such as the illustrative method set forth below with reference to FIG. 3.

Figure 3:
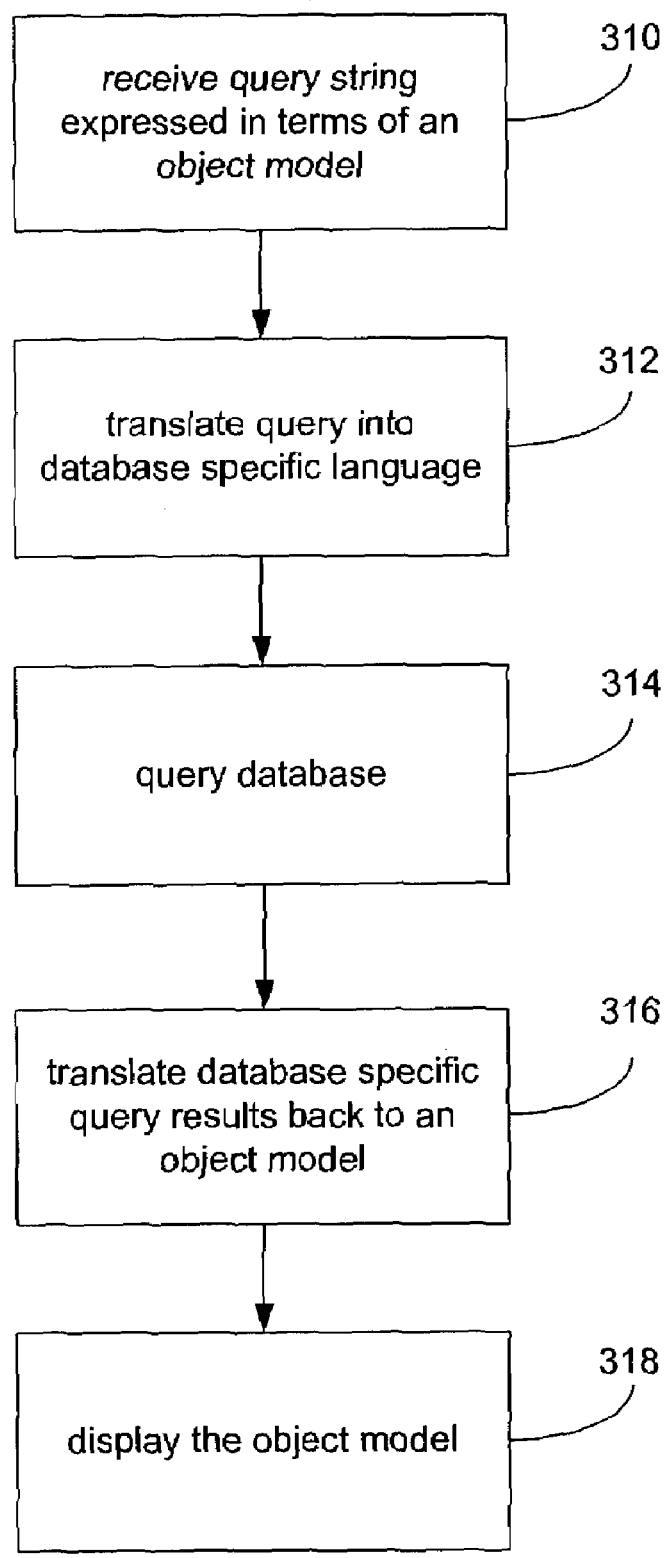
FIG. 3 is a flowchart of an illustrative method for presenting a query in accordance with the present invention.

FIG. 3 is a flowchart of an illustrative method for presenting a query in accordance with the present invention. At step 310, mapping engine 232 running on server 230 receives a query expressed in terms of an object model.

Figure 4:
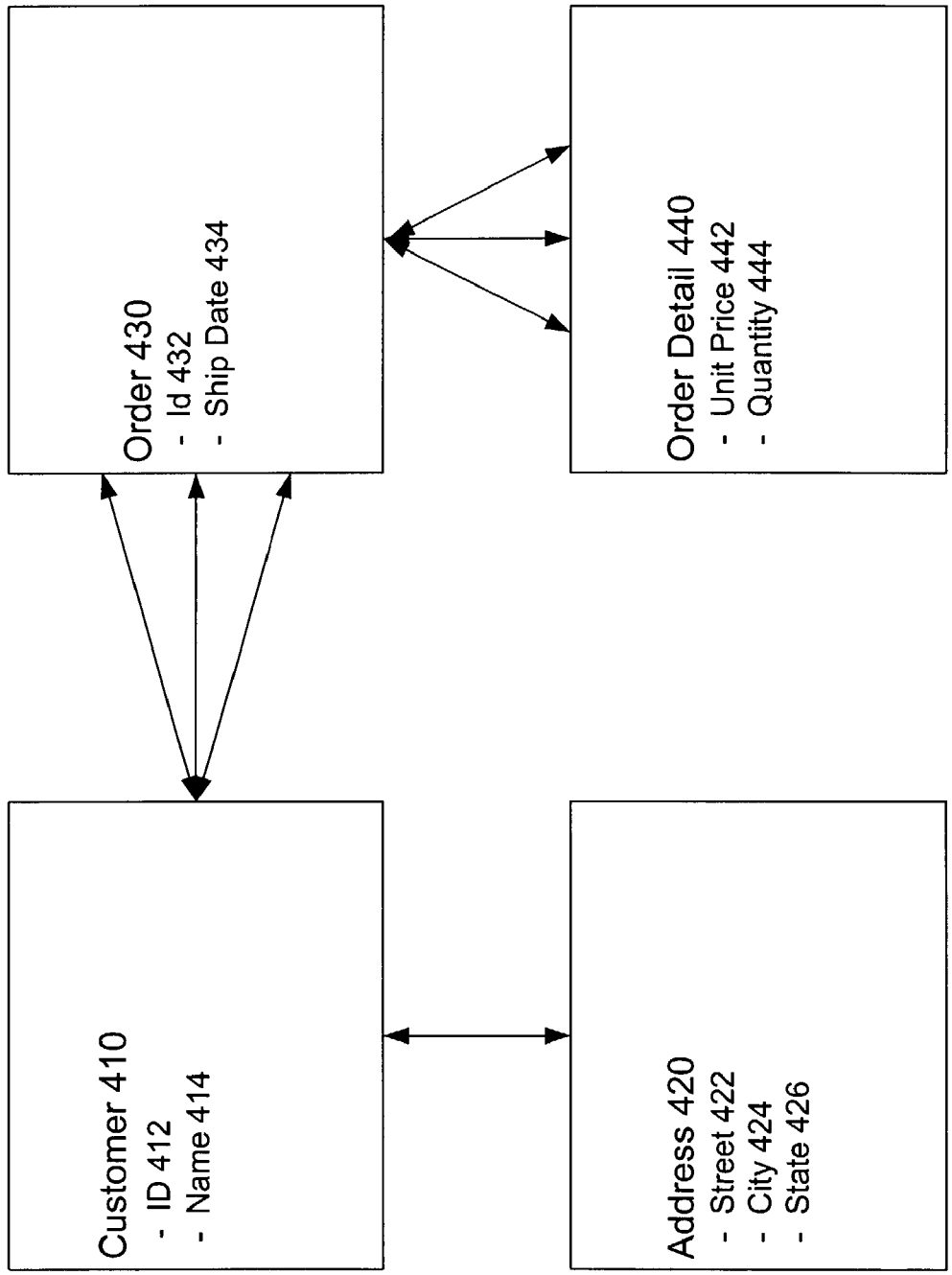
FIG. 4 is a sample object model in accordance with the present invention.

A sample of such an object model in accordance with step 310 of FIG. 3 is shown in FIG. 4. As shown, Customer type 410 has properties Customer ID 412 and Name 414. Address type 420 has properties Street 422, City 424, and State 426. Order type 430 has properties Order ID 432 and Ship Date 434. Order Detail type 440 has properties Unit Price 442 and Quantity 444.

A particular customer entry in Customer type 410 may have a unique associated address entry in Address type 420, as indicated by a single arrow from Customer type 410 to Address type 420. A particular customer may also have multiple associated order entries in Order type 430, as indicated by arrows from a single point at Customer type 410 to multiple points at Order type 430.

A particular order entry in Order type 430 may also have multiple associated order detail entries in Order Detail type 440, as indicated by arrows from a single point at Order type 440 to multiple points at Order Detail type 440.

The query received by the mapping engine at step 310 of FIG. 3 is expressed in terms of an object model such as the sample object model of FIG. 4. The query includes a first instruction identifying objects of a first type. The query also includes a second instruction identifying selected objects of the first type to be retrieved. The selected objects of the first type identified by the second instruction may be objects of the first type that have a property that satisfies a first condition. Such a first condition may be referred to as a "primitive" property. The primitive property may be a property of an object that satisfies a particular condition such as, for example, an integer value, a string, or a date.

An exemplary primitive property query corresponding to the sample object model of FIG. 4 is set forth below:

GetObjects(typeof(Customer), "Name='John'")

The phrase "GetObjects" identifies that the query is an object query. The first instruction "typeof(Customer)" identifies Customer type 410 of FIG. 4 as the objects of the first type. The second instruction "Name='John'" identifies name property 414 being equal to "John" as the first condition. Thus, the selected objects of the first type are customers named John. The query will retrieve all customers named John stored at database 240.

In addition to possessing a primitive property, the selected objects of the first type identified by the second instruction may possess a "link" property. Objects of the first type that possess such a link property are objects of the first type that are associated with or "linked" to selected objects of a second type. For example, customer entries in Customer type 410 of FIG. 4 may each have one or more associated order entries in Order type 430 of FIG. 4. Entries in Customer type 410 that have such associated order data would be "linked" to Order type 430. An exemplary link property query corresponding to the sample object model of FIG. 4 is set forth below:

GetObjects(typeof(Customer), "Orders")

The first instruction "typeof(Customer)" identifies Customer type 410 of FIG. 4 as the objects of the first type. The second instruction "Orders" identifies Orders type 430 as the selected objects of the second type. The selected objects of the first type are all objects of the first type that are associated with the selected objects of the second type. Thus, the selected objects of the first type are all customers associated with orders. The query will retrieve all customers for which is stored associated order data at database 240.

A link property query may also include a primitive property in the link. Specifically, the selected objects of the second type may be objects of the second type that satisfy a second condition. A dot "." operator may be used in the second instruction to identify the second condition. An example of such a link property query including a primitive property in the link is set forth below:

GetObjects(typeof(Customer), "Orders.ShipDate=July1")

In this example, the second instruction "Orders.ShipDate=July1" identifies Orders type 430 as the objects of the second type. The second instruction also identifies Ship Date property 434 being equal to July 1 as the second condition. Thus, the selected objects of the second type are orders with a ship date of July 1. The selected objects of the first type are customers associated with orders with a ship date of July 1. The query will retrieve all customers for which is stored associated order data with a ship date of July 1.

In addition to including a single "link" to objects of a second type, a link property query may include multiple links to multiple object types. A dot "." operator may be used in the second instruction to identify such multiple links. Each object type specified in the second instruction must be associated with the previous specified object type. An example of such a link property query including multiple links and corresponding to the sample object model of FIG. 4 is set forth below.

GetObjects(typeof(Customer), "Orders.Details")

In this example, the second instruction "Orders.Details" identifies Orders type 430 as the objects of the second type. The second instruction also identifies a link between Orders type 430 and Details type 440. Thus, the selected objects of the second type are orders associated with order details. The selected objects of the first type are all customers associated with orders associated with order details. The query will retrieve all customers for which is stored associated order data for which is stored associated order detail data.

The selected objects of the second type may be restricted by applying a filter. The filter is described by an expression enclosed between square brackets "[]". An exemplary link property query employing such a filter is set forth below:

GetObjects(typeof(Customer), "Orders[ShipDate=July 1].Details[Quantity>50]")

In this example, the second instruction "Orders[ShipDate=July 1].Details.Quantity>50" identifies Orders type 430 as the second type. The second instruction identifies Ship Date property 434 being equal to July 1st as the second condition. The second instruction identifies a link between Orders type 430 and Details type 440. The second instruction also identifies Quantity property 444 being greater than 50 as a condition of Details type 440. Thus, the query will retrieve all customers having an order to be shipped on July 1st and a quantity greater than 50.

A carrot operator "^" may be included in the second instruction to refer to properties of the objects of the first type. An exemplary link property query employing such a carrot operator is set forth below:

GetObjects(typeof(Customer), "Orders[ShipDate=July 1 and ^Name='John']")

In this example, the second instruction "Orders[ShipDate=July 1 and ^Name='John']" identifies entries in Customer type 410 with Name property 414 equal to John for which exist an entry or entries in Order type 430 with Ship Date property 434 equal to July 1st. The query will retrieve all customers named John having an order to be shipped on July 1st.

A query string may also be "empty". An empty query string will retrieve all objects of the first type.

In addition to the instructions set forth above, the query string may also include a set of one or more statements that may be referred to as a "Span." Each statement identifies additional associated objects to be retrieved. Specifically, a first statement may identify selected objects of a third type to be retrieved. Two exemplary queries are set forth below. The first exemplary query includes only instructions. The second exemplary query includes instructions and a first statement.

GetObjects(typeof(Customer), "Name=John")
GetObjects(typeof(Customer), "Name=John", "Address")

The first exemplary query will retrieve only the selected objects of the first type, which are customers whose name is John. However, the second exemplary query includes the first statement "Address", which identifies Address type 420 as the objects of the third type. Thus, the selected objects of the third type are addresses associated with customers named John. The second exemplary query will retrieve the selected objects of the first type and the selected objects of the third type. Thus, the second query will retrieve not only customers whose name is John, but it will also retrieve the address of such customers.

A statement may include an associated object that possesses a primitive property. Specifically, the selected objects of the third type identified by the first statement may be objects of the third type that satisfy a third condition. The dot "." operator set forth above to identify the second condition in the second instruction may also be used to identify the third condition in the first statement. An example of such a query including a statement with an associated object possessing such a primitive property is set forth below:

GetObjects(typeof(Customer), "Name=John", "Orders.ShipDate=July 1")

In this example, the first statement "Orders.ShipDate=July 1" identifies Orders type 430 as the objects of the third type. The first statement also identifies ship date property 434 being equal to July 1 as the third condition. Thus, the selected objects of the third type are orders with a ship date of July 1 associated with customers named John. The query will retrieve customers whose name is John and orders of such customers with a July 1st ship date.

A statement may also include an associated object that possesses a link property. Specifically, a first statement may include selected objects of a fourth type that are associated with the selected objects of the third type. A dot operator may be used to identify the selected objects of the fourth type. An example of such a query including such a statement with an associated object possessing such a link property is set forth below:

GetObjects(typeof(Customer), "Name=John", "Orders.Details")

In this example, the first statement "Orders.Details" identifies Orders type 430 as the objects of the third type. The first statement also identifies Details type 440 as the objects of the fourth type. Thus, the selected objects of the fourth type are details associated with orders associated with customers named John. Thus, the query will retrieve customers whose name is John, orders of such customers, and the order details of such orders.

In addition to including a single statement, a query may also include multiple statements. An exemplary query including such multiple statements is set forth below:

GetObjects(typeof(Customer), "Name=John", "Address, Orders")

The above example includes the statements "Address, Orders". The first statement "Address" identifies entries in Address type 420 associated with customers named John. The second statement "Orders" identifies entries in Orders type 430 associated with customers named John. Thus, the query will retrieve customers whose name is John, the address of such customers, and the orders of such customers.

The instructions and statements set forth above may include operators generally used in Boolean expressions such as, for example, "and" statements, "or" statements, "not" statements, and arithmetic expressions such as greater than, less than, greater than or equal to, less than or equal to, and equal to.

Thus, the query string received by mapping engine 232 of FIG. 2 at step 310 of FIG. 3 includes two instructions and may also include one or more statements. After the query string is received, mapping engine 232 translates the query at step 312. Mapping engine 232 translates the query into a language specific to database 240 such as, for example, Structured Query Language (SQL). An exemplary translation from a query expressed in terms of an object model to two corresponding SQL statements is shown below:

Query: GetObjects(typeof(Customer), "Name=John", "Orders")

Translation: SELECT *
FROM customer table
WHERE name=John

At step 314, server 230 queries database 240 with the translated query. After the query is performed, at step 316, server 230 receives query results from database 240. Query results may be received in tabular form. An exemplary query result corresponding to the exemplary translation is shown below in Table 1:

TABLE 1

| Customer ID | Name |
|---|---|
| 1 | John |
| 4 | John |

At step 318, mapping engine 232 translates the query results into an object model. For example, the exemplary query results shown in Table 1 may be translated to exemplary object model of FIG. 4. Each entry in the "Customer ID" column in Table 1 has a corresponding entry in Customer ID property 412 of FIG. 4. Each entry in the "Name" column in table 1 has a corresponding entry in Name property 414 of FIG. 4. At step 320, the resulting object model is transmitted back to workstation 210 for display at workstation 210. The resulting object model may be displayed on a display device such as monitor 147 of FIG. 1.

Thus, systems and methods for presenting a query expressed in terms of an object model are disclosed. A query author defines and submits to a mapping engine a query expressed in terms of an object model. The query includes a first instruction identifying a type of objects and a second instruction identifying selected objects of the identified type to be retrieved. The query may also include one or more statements identifying additional associated object types to be retrieved. The mapping engine translates the query into a database specific language, and a database is queried with the translated query. Query results are received from the database. The mapping engine translates the query results into an object model. The object model may be displayed on a display device. Systems and methods of the present invention enable queries to be presented with only two instructions, thereby decreasing the length and complexity of queries. Furthermore, systems and methods of the present invention enable the query author to retrieve multiple associated objects rather than only a single object.

While the present invention has been described in connection with the preferred embodiments of the various figures, it is to be understood that other similar embodiments may be used or modifications and additions may be made to the described embodiment for performing the same function of the present invention without deviating therefrom. For example, while the present invention is described above in connection with query strings including one statement and two statements, the present invention may employ a query string including any number of statements. Furthermore, while the present invention is described above in connection with query strings corresponding to the sample object model of FIG. 4, the present invention may employ query strings corresponding to an object model of any collection of data stored in any database or databases. Therefore, the present invention should not be limited to any single embodiment, but rather should be construed in breadth and scope in accordance with the appended claims.

We claim:

1. A method implemented at least in part by a computing device for presenting a query string, comprising:
receiving the query string expressed in terms of an object model, the query string comprising a first instruction identifying objects of a first type, a second instruction identifying a selected instance of the first object type, and an additional instruction identifying an additional object type, the first object type and the additional object type having a one to many relationship whereby each instance of the first object type has multiple related instances of the additional object type, the query string directing a database to retrieve data for the selected instance of the first object type and data for all instances of the additional object type that are related to the selected instance of the first object type;
translating the query into a database specific language;
querying the database with the translated query;
receiving query results from the database including the data for the selected instance of the first object type and the data for all instances of the additional object type related to the selected instance of the first object type; and
translating the query results into the object model.

2. The method of claim 1, wherein the selected instance of the first object type has a property that satisfies a first condition.

3. The method of claim 2, wherein the first condition is that the property be an integer that is one of equal to, greater than, and less than a specified integer.

4. The method of claim 2, wherein the first condition is that the property be a string that is identical to a specified string.

5. The method of claim 2, wherein the first condition is that the property be a date that is identical to a specified date.

6. The method of claim 1, further comprising displaying the object model.

7. A system for presenting a query string, comprising:
a database that stores data;
a mapping engine comprising an object model of the data stored at the database, a processor operative to execute computer executable instructions, and a memory having stored therein computer executable instructions for performing the following steps:
receiving the query string expressed in terms of the object model, the query string comprising a first instruction identifying objects of a first type, a second instruction identifying a selected instance of the first object type, and an additional instruction identifying an additional object type, the first object type and the additional object type having a one to many relationship whereby each instance of the first object type has multiple related instances of the additional object type, the query string directing a database to retrieve data for the selected instance of the first object type and data for all instances of the additional object type that are related to the selected instance of the first object type;
translating the query into a database specific language;
querying the database with the translated query;
receiving query results from the database including the data for the selected instance of the first object type and the data for all instances of the additional object type related to the selected instance of the first object type; and
translating the query results into the object model.

8. The system of claim 7, wherein the selected instance of the first object type has a property that satisfies a first condition.

9. The system of claim 8, wherein the first condition is that the property be an integer that is one of equal to, greater than, and less than a specified integer.

10. The system of claim 8, wherein the first condition is that the property be a string that is identical to a specified string.

11. The system of claim 8, wherein the first condition is that the property be a date that is identical to a specified date.

12. The system of claim 7, further comprising an input device operative to receive computer executable instructions.

13. The system of claim 7, further comprising a display device for displaying the object model.

14. A computer readable medium having stored thereon computer readable instructions for performing the following steps:

receiving a query string expressed in terms of an object model, the query string comprising a first instruction identifying objects of a first type, a second instruction identifying a selected instance of the first object type, and an additional instruction identifying an additional object type, the first object type and the additional object type having a one to many relationship whereby each instance of the first object type has multiple related instances of the additional object type, the query string directing a database to retrieve data for the selected instance of the first object type and data for all instances of the additional object type that are related to the selected instance of the first object type;

translating the query into a database specific language;

querying the database with the translated query;

receiving query results from the database including the data for the selected instance of the first object type and the data for all instances of the additional object type related to the selected instance of the first object type; and translating the query results into the object model.

15. The computer readable medium of claim 14, wherein the selected instance of the first object type has a property that satisfies a first condition.

16. The computer readable medium of claim 15, wherein the first condition is that the property be an integer that is one of equal to, greater than, and less than a specified integer.

17. The computer readable medium of claim 15, wherein the first condition is that the property be a string that is identical to a specified string.

18. The computer readable medium of claim 15, wherein the first condition is that the property be a date that is identical to a specified date.

19. The computer readable medium of claim 14, further comprising computer executable instructions for performing the step of displaying the object model.

* * * * *